(12) United States Patent
McKinstrie et al.

(10) Patent No.: US 7,324,759 B2
(45) Date of Patent: Jan. 29, 2008

(54) METHOD AND APPARATUS FOR REDUCING PHASE JITTER IN AN OPTICAL COMMUNICATION SYSTEM

(75) Inventors: Colin J. McKinstrie, Manalapan, NJ (US); Stojan Radic, Chapel Hill, NC (US); Chongjin Xie, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 739 days.

(21) Appl. No.: 10/609,729

(22) Filed: Jun. 30, 2003

(65) Prior Publication Data

US 2004/0264979 A1 Dec. 30, 2004

(51) Int. Cl.
*H04B 10/18* (2006.01)
(52) U.S. Cl. .................................... 398/150
(58) Field of Classification Search ................ 398/150, 398/135, 189, 190
See application file for complete search history.

(56) References Cited

U.S. PATENT DOCUMENTS

| | | | | |
|---|---|---|---|---|
| 6,175,435 B1 * | 1/2001 | Watanabe | .................... | 398/150 |
| 6,504,972 B2 * | 1/2003 | Watanabe | .................... | 385/24 |
| 6,539,153 B2 * | 3/2003 | Taneda et al. | .............. | 385/122 |
| 6,856,770 B2 * | 2/2005 | Bai | ............................. | 398/148 |
| 7,062,176 B2 * | 6/2006 | Liu et al. | .................... | 398/159 |
| 2003/0039006 A1 | 2/2003 | Carbone et al. | ............ | 359/124 |

OTHER PUBLICATIONS

Xiang Liu, Phase-Shift-Keyed systems by used of lumped nonlinear phase-shift compensation, Sep. 15, 2002, Optics Letters, vol. 27, No. 18, p. 1616-1618.*

"Phase Jitter in Single-Channel Soliton Systems With Constant Dispersion", C. J. McKinstrie and C. Xie, IEEE Journal of Selected Topics in Quantum Electronics, vol. 8, No. 3, May/Jun. 2003, pp. 616-625.

"Improving Transmission Performance in Differential Phase-Shift-Keyed Systems by Use of Lumped Nonlinear Phase-Shift Compensation", X. Liu et al., Optics Letters, vol. 27, No. 18, Sep. 15, 2002, pp. 1616-1618.

"Postnonlinearity Compensation with Data-Driven Phase Modulators in Phase-Shift Keying Transmission", Chris Xu and Xiang Liu, Optics Letters, vol. 27, No. 18, Sep. 15, 2002, pp. 1619-1621.

* cited by examiner

*Primary Examiner*—Leslie Pascal

(57) ABSTRACT

Method and apparatus for transmitting a light signal in an optical transmission system is described. In an example, an optical transmission link includes an input port and an output port. The optical transmission link is configured to propagate optical pulses from the input port to the output port. Information is encoded using phase relationships between adjacent ones of the optical pulses. A phase conjugator is disposed between the input port and the output port. The phase conjugator is positioned to reduce phase variance of the optical pulses at the output port.

25 Claims, 3 Drawing Sheets

METHOD AND APPARATUS FOR REDUCING PHASE JITTER IN AN OPTICAL COMMUNICATION SYSTEM

BACKGROUND OF THE INVENTION

1. Field of the Invention

The present invention generally relates to optical communication systems and, more particularly, to reducing phase jitter in an optical communication system.

2. Description of the Related Art

In the propagation of optical pulses in ultra-long haul (ULH) applications, such as transoceanic transmission, numerous parameters associated with such transmission limit the capacity of the optical fiber cable system through which the optical pulses are transmitted. Pulse timing jitter is a major limitation to the maximum reach of ULH on-off transmission systems. For single-channel systems, a significant source of timing jitter is attributed to contributions from transmitter and receiver electronics, acoustic interaction effects, or especially, in the case of soliton transmission, to the Gordon-Haus effect. The Gordon-Haus effect is caused by the interaction of soliton pulses with amplifier spontaneous emission (ASE) noise present along the transmission medium. For multi-channel wavelength division multiplexed (WDM) systems, timing jitter is increased significantly by inter-channel soliton collisions. This collision-induced (CI) timing jitter is the dominant impairment of WDM soliton systems. Thus the search continues for other transmission formats that are less susceptible to timing jitter.

One such transmission format that has attracted attention is a differential-phase-shift-keyed (DPSK) modulation format. In a DPSK system (as well as other phase-shift keying (PSK) modulation formats, such as quadrature phase-shift keying (QPSK)), information is encoded using phase differences between neighboring optical pulses (e.g., solitons). For PSK systems, however, the error-free transmission distance is limited by phase jitter, in which power shifts caused by ASE are converted into phase shifts by self-phase modulation (SPM). It is thus desirable to provide a practical and cost effective method and apparatus for reducing phase jitter in an optical communication system.

SUMMARY OF THE INVENTION

These and other deficiencies of the prior art are addressed by the present invention of a method and apparatus for transmitting a light signal in an optical transmission system. In one embodiment, an optical transmission link includes an input port and an output port. The optical transmission link is configured to propagate optical pulses from the input port to the output port. Information is encoded using phase relationships between adjacent ones of the optical pulses. A phase conjugator is disposed between the input port and the output port. The phase conjugator is positioned to reduce phase variance of the optical pulses at the output port.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

A method and apparatus for reducing phase jitter in an optical communications system is described. One or more aspects of the invention are related to reducing phase jitter in a single channel differential-phase-shift-keyed (DPSK) optical transmission system exhibiting constant dispersion. Those skilled in the art will appreciate, however, that the invention may be used to reduce phase jitter in other types of phase-shift-keyed (PSK) optical transmission systems, such as multi-channel (e.g., WDM) and/or dispersion managed (DM) PSK systems.

Figure 1:
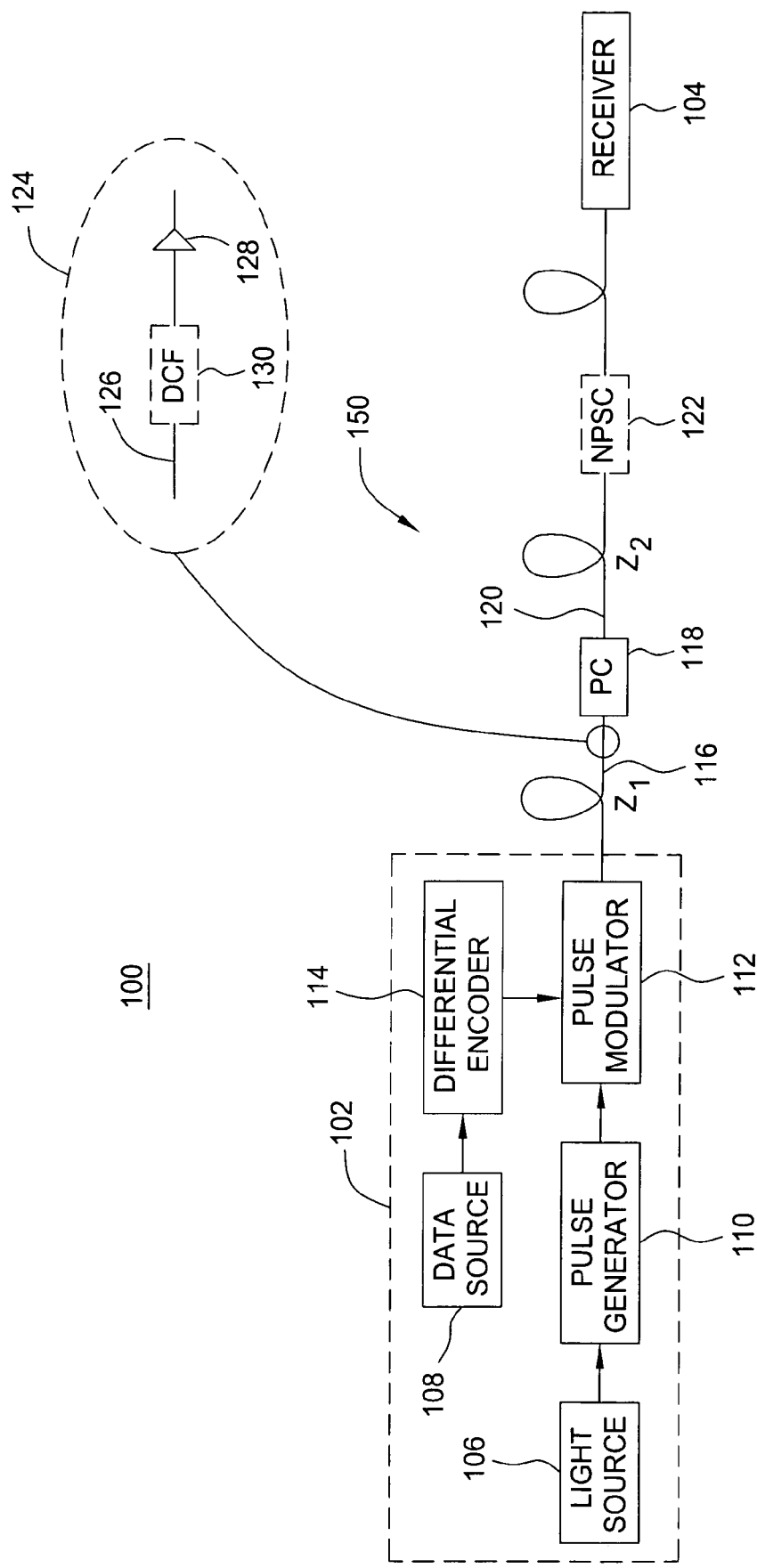
FIG. 1 is a block diagram depicting an exemplary embodiment of an optical transmission system in accordance with the invention.

FIG. 1 is a block diagram depicting an exemplary embodiment of an optical transmission system 100 in accordance with the invention. The optical transmission system 100 comprises a transmitter 102, an optical transmission link 150, and a receiver 104. The transmitter 102 illustratively comprises a laser source 106, a pulse generator 110, a pulse modulator 112, a data source 108, and a differential encoder 114. The laser source 102 operates in a continuous wave (CW) mode to produce light at a predefined transmission wavelength. The light generated by the laser source 102 is coupled to the pulse generator 110 to generate a pulse train. For example, a train of optical pulses (e.g., solitons) may be produced having a repetition rate of 10 GHz and a duty cycle of 33% (pulse full width half maximum (FWHM) of 33 ps).

The pulse modulator 112 modulates the optical pulse train in accordance with an output of the differential encoder 114. The differential encoder 114 encodes data from the data source 108 using the phase of the optical pulses of the pulse train. For example, every '0' in the data may be represented by a shift in the relative phase of two adjacent optical pulses of $\pi$ radians, and every '1' in the data may be represented by a shift in the relative phase of two adjacent optical pulses of 0 radians (i.e., DPSK modulation). The output of the pulse modulator 112 is launched into the optical transmission link 150.

The optical transmission link 150 includes a section 116, a phase conjugator (PC) 118, and a section 120. The phase conjugator 118 divides the optical transmission link 150 such that the section 116 has a length $z_1$ and the section 120 has a length $z_2$. Each of the sections 116 and 120 may include one or more spans 124 of predefined length (e.g., 100 km). Each of the spans 124 may include an optical fiber 126 and an amplifier 128. In one embodiment, the optical transmission link 150 may exhibit constant dispersion (CD). As such, the optical fiber 126 of a given span 124 may be anomalous optical fiber. In another embodiment, the optical transmission link 150 may exhibit dispersion management (DM). In such an embodiment, each of the spans 124 may further comprise a dispersion compensating fiber (DCF) 130. The amplifier 128 of each of the spans 124 may be an erbium doped fiber amplifier (EDFA), Raman amplifier, or like type optical amplifiers, or any combination thereof. The phase conjugator 118 may be a parametric amplifier or like type phase conjugation device known in the art. At the output of the phase conjugator 118, the spectrum of the optical pulse train becomes a mirror image of the spectrum at the input of the phase conjugator 118. In other words, the optical channel undergoes a spectral inversion. Operation of the phase conjugator 118 is well-known in the art.

As described above, the main impairment of PSK optical transmission systems is phase jitter, in which power fluctuations caused by amplifier noise are converted into phase fluctuations by self-phase modulation (SPM). For purposes of clarity by example, the effects of phase jitter within a single-channel soliton transmission system is illustrated below. Notably, provided that the overall length, z, of the optical transmission link 150 is much longer that the dispersion length, the soliton condition is maintained adiabatically and the growth of the normalized soliton power- and phase-perturbations is governed approximately by the following correlation equations:

$$d_z \langle p^2 \rangle = \sigma_p, \tag{1}$$

$$d_z \langle p\phi \rangle = \bar{\gamma} \langle p^2 \rangle, \tag{2}$$

$$d_z \langle \phi^2 \rangle = \sigma_\phi + 2\bar{\gamma} \langle p\phi \rangle, \tag{3}$$

where $d_z$ indicates a derivative with respect to z, $\langle \rangle$ denotes an ensemble average, $\langle p^2 \rangle$ is the power variance, $\langle \phi^2 \rangle$ is the phase variance, $\langle p\phi \rangle$ is the correlation between power and phase, $\sigma_p$ is the strength of noise-induced power kicks, $\sigma_\phi \approx \sigma_p/4$ is the strength of noise-induced phase kicks, and $\bar{\gamma}$ is the effective nonlinearity coefficient. Formulas for these quantities are stated in C. J. McKinstrie and C. Xie, "Phase Jitter in Single-Channel Soliton Systems with Constant Dispersion", IEEE Journal of Selected Topics in Quantum Electronics, vol. 8, no. 3, May/June 2002, which is incorporated by reference herein in its entirety. The noise-induced power and phase kicks are attributable to amplifier noise within the system 100.

Let $z_0$ be the initial soliton position and let $z_1$ be any subsequent position. Then, integrating Equations (1) through (3) yields the following:

$$\langle p^2 \rangle_1 = \langle p^2 \rangle_0 + \sigma_p z_1, \tag{4}$$

$$\langle p\phi \rangle_1 = \langle p\phi \rangle_0 + \langle p^2 \rangle_0 \bar{\gamma} \cdot z_1 + \frac{\sigma_p \bar{\gamma} \cdot z_1^2}{2}, \tag{5}$$

$$\langle \phi^2 \rangle_1 = \langle \phi^2 \rangle_0 + 2\langle p\phi \rangle_0 \bar{\gamma} \cdot z_1 + \langle p^2 \rangle_0 \bar{\gamma}^2 \cdot z_1^2 + \sigma_\phi z_1 + \frac{\sigma_p \bar{\gamma}^2 \cdot z_1^3}{3}. \tag{6}$$

Suppose that the input solitons are unperturbed. Then Equations (4) through (6) are consistent with the standard results that the power variance grows with increasing z, and the phase variances grows (asymptotically) as $z^3/3$. As is apparent to those skilled in the art, the rapid growth of the phase variance limits the transmission distance of a DPSK system.

Returning to system 100 of FIG. 1, Equations (4) through (6) apply to the section 116 having a length $z_1$ (where the initial position, $z_0$, is the start of the optical transmission link 150). The phase conjugator 118 has no effect on the power and phase variances, but changes the sign of the correlation between power and phase. Equations (4) through (6) also apply to the section 120 having a length $z_2$, provided that the subscripts 0 and 1 are changed to 1 and 2, respectively. It follows from these observations that:

$$\langle p^2 \rangle_2 = \sigma_p(z_1 + z_2), \tag{7}$$

$$\langle p\phi \rangle_2 = \sigma_p \bar{\gamma} \left[ \frac{(z_1 + z_2)^2}{2} - z_1^2 \right], \tag{8}$$

$$\langle \phi^2 \rangle_2 = \sigma_\phi (z_1 + z_2) + \sigma_p \bar{\gamma}^2 \left[ \frac{(z_1 + z_2)^3}{3} - 2z_1^2 z_2 \right]. \tag{9}$$

As apparent from Equation (9), the phase conjugator 118 does not affect the growth of phase perturbations that are driven (directly) by phase kicks. The phase conjugator 118 does have an effect, however, on phase perturbations that are driven (indirectly) by power kicks.

Notably, in one embodiment, the phase conjugator 118 is symmetrically placed ("symmetric PC configuration") within optical transmission link 150 (i.e., $z_1 = z_2$). In such an embodiment, the output phase variance of the optical transmission link 150 (i.e., $\langle \phi^2 \rangle_2$) is proportional to $z^3/12$, where $z = z_1 + z_2$ is the total length of the optical transmission link 150. Thus, in the symmetric PC configuration, the phase variance is reduced by a factor of four. Suppose that phase jitter in the system 100 begins to cause errors at a critical distance $z_c$ along the optical transmission link 150. Then, by symmetrically placing the phase conjugator 118 along the optical transmission link 150, the maximal transmission distance of the system 100 is increased by a factor of 1.59.

In another embodiment, the phase conjugator 118 may be asymmetrically placed ("asymmetric PC configuration") along optical transmission link 150 (i.e., $z_1 \neq z_2$). Let $x = z_1/z$, then $z_2/z = 1 - x$. Thus, the phase variance $\langle \phi^2 \rangle_2$ may be represented by the following:

$$\langle \phi^2 \rangle_2 = \left( \frac{\sigma_p \bar{\gamma} \cdot z^3}{3} \right) v(x), \tag{10}$$

where $$v(x) = 1 - 6x^2(1 - x), \tag{11}$$

A standard minimization calculation shows that the optimal value of x is 2/3 and the corresponding minimal value of v is 1/9. As such, the optimal lengths of the sections 116 and 120 are $z_1 = 2z/3$ and $z_2 = z/3$, for which the minimal phase variance is proportional to $z^3/27$. Thus, in the asymmetric PC configuration, the output phase variance may be reduced by a factor of nine and the maximal transmission distance of the system 100 may be increased by a factor of 2.08.

It is clear from Equation (9) that the output phase variance of the optical transmission link 150 depends on the nonlinear phase-shift coefficient $\bar{\gamma}z$. Consequently, the phase variance of system 100 may be further reduced using post transmission nonlinear phase-shift compensation. Notably, in another embodiment, a nonlinear phase-shift compensator (NPSC) 122 is coupled to the optical transmission link 150 before the receiver 104. Suppose that each soliton is subject to a compensating phase shift that is proportional to its power ($\phi_c = \kappa p$). Then the compensated correlation equations are as follows:

$$\langle p^2 \rangle_c = \langle p^2 \rangle, \qquad (12)$$

$$\langle p\phi \rangle_c = \langle p\phi \rangle + \kappa \langle p^2 \rangle, \qquad (13)$$

$$\langle \phi^2 \rangle_c = \langle \phi^2 \rangle + 2\kappa \langle p\phi \rangle + \kappa^2 \langle p^2 \rangle \qquad (14)$$

The optimal phase-shift coefficient is thus:

$$\kappa_c = -\frac{\langle p\phi \rangle}{\langle p^2 \rangle}. \qquad (15)$$

The minimal phase variance is shown by:

$$\langle \phi^2 \rangle_c = \langle \phi^2 \rangle - \frac{\langle p\phi \rangle^2}{\langle p^2 \rangle}. \qquad (16)$$

Equations (15) and (16) apply to any system without a phase conjugator, or with one or more phase conjugators along the optical transmission link.

If the correlation between phase and power is greater than zero (i.e., there is no phase conjugator), then $\kappa < 0$. If such a negative phase-shift is required, the NPSC 122 may be produced by cascaded quadratic processes or may be a phase modulator. If the correlation between phase and power is greater than zero, as it is in the system 100 having the phase conjugator 118 and $z_2 < 0.29z$, then $\kappa > 0$. If such a positive phase-shift is required, the NPSC 122 may be a section of highly nonlinear fiber (HNF).

In the symmetric PC configuration, the NPSC 122 reduces the phase variance of the system 100 by an additional factor of four (a total factor of 16). In the asymmetric PC configuration, the NPSC 122 reduces the phase variance of the system 100 by an additional factor of 12/11 (a total factor of 108/11). The performance improvements associated with on (a)symmetrically-placed phase conjugator, with and without an NPSC, are summarized in Table 1. In the column headings, S, A, and NC are abbreviations for symmetric PC configuration, asymmetric PC configuration, and NPSC, respectively.

TABLE 1

|  | 1 S | 1 S + NC | 1 A | 1 A + NC |
| --- | --- | --- | --- | --- |
| Jitter reduction | 4.00 | 16.0 | 9.00 | 9.82 |
| Range extension | 1.59 | 2.52 | 2.08 | 2.14 |

Figure 4:
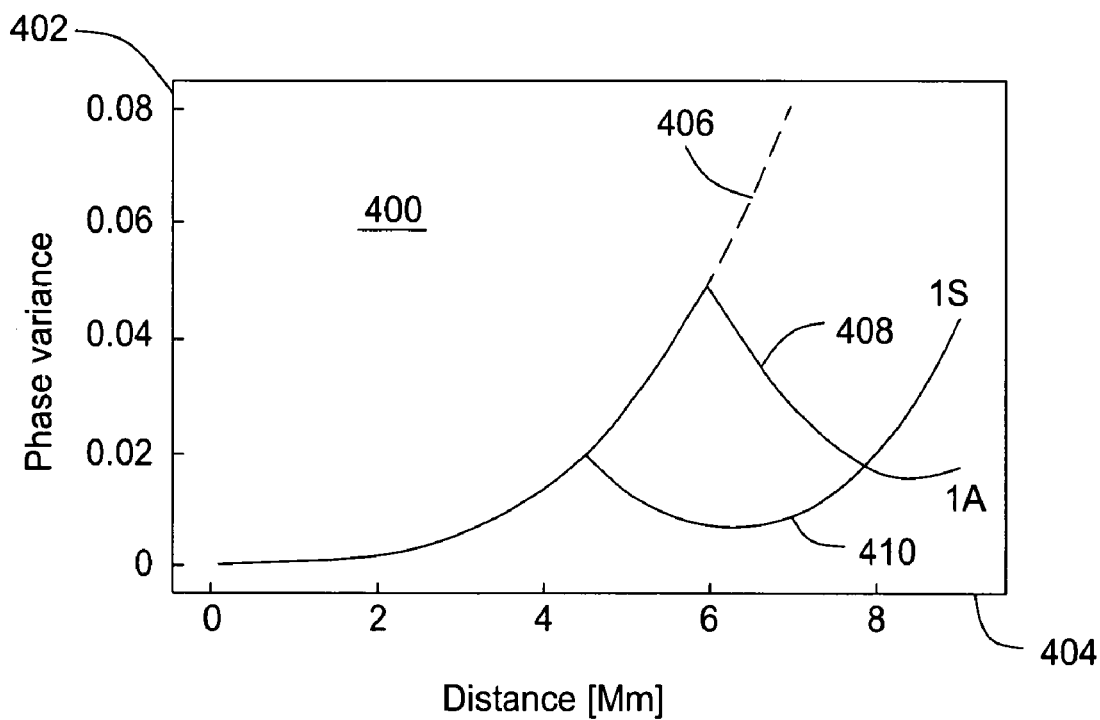
FIG. 4 is a graph depicting an exemplary phase variance versus distance for the optical transmission system of FIG. 1.

FIG. 4 is an exemplary graph 400 illustrating the phase variances as functions of distance for the system of FIG. 1. In this example, the system 100 is configured as follows: The fiber dispersion, loss, and nonlinearity coefficients are −0.3 ps$^2$/km, 0.21 dB/km, and 1.7/km-W, respectively. The total length of the optical transmission link 150 is 9.0 million meters (Mm). Fiber loss is compensated by uniformly-distributed Raman amplification, for which the spontaneous-emission factor is 1.1. The soliton full-width at half-maximum is 30 ps and the associated peak power was 0.60 mW. Solving the NS equation numerically for an ensemble of approximately 10$^4$ solitons yields the graph 400.

Notably, an axis 402 represents phase variance, and an axis 404 represents distance in Mm. A curve 406 represents the phase variance without the presence of a phase conjugator. A curve 408 represents the phase variance with an asymmetrically placed phase conjugator (i.e., the section 116 has a length of $z_1 = 2z/3$ and the section 120 has a length of $z_2 = z/3$, where z is the total length). A curve 410 represents the phase variance with a symmetrically placed phase conjugator (i.e., $z_1 = z_2$). As shown, the output phase variance of the system 100 is reduced by using the phase conjugator 118 in both an asymmetric and a symmetric position along the optical transmission link 150.

Figure 2:
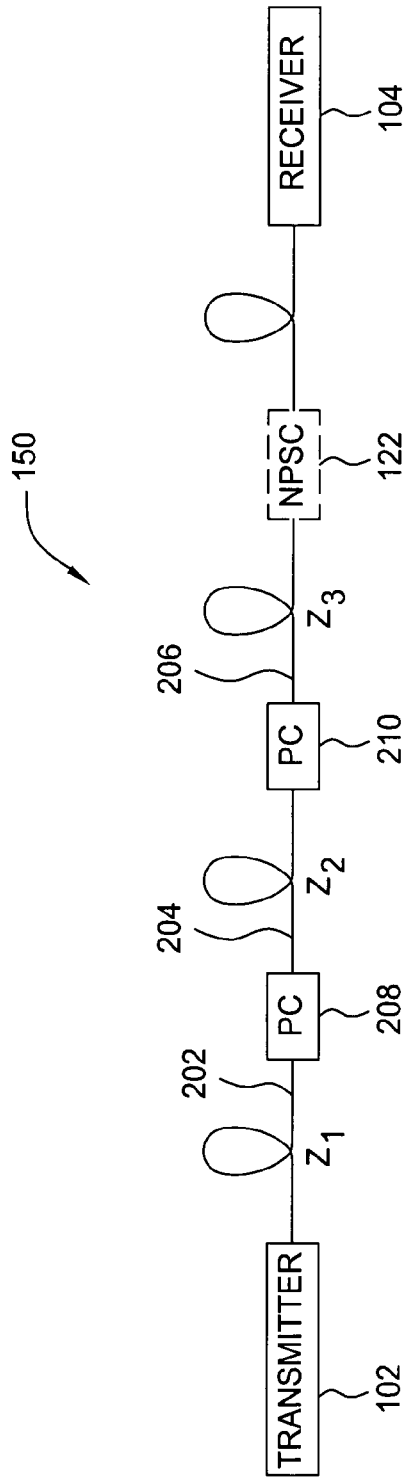
FIG. 2 is a block diagram depicting another embodiment of an optical transmission system in accordance with the invention.

FIG. 2 is a block diagram depicting another embodiment of the optical transmission system 100 in accordance with the invention. Elements of FIG. 2 that are the same or similar to elements of FIG. 1 are designated with identical reference numerals and are described in detail above. In the present embodiment, the optical transmission link 150 comprises two phase conjugators 208 and 210. The phase conjugators 208 and 210 divide the optical transmission link 150 into a section 202 having a length $z_1$, a section 204 having a length $z_2$, and a section 206 having a length $z_3$. Extending the derivation of Equations (7) through (9) yields the following:

$$\langle p^2 \rangle_3 = \sigma_p (z_1 + z_2 + z_3), \qquad (17)$$

$$\langle p\phi \rangle_3 = \sigma_p \gamma \left[ \frac{(z_1 + z_2 + z_3)^2}{2} - (z_1 + z_2)^2 + z_1^2 \right], \qquad (18)$$

$$\langle \phi^2 \rangle_3 = \sigma_p \gamma \left\{ \frac{(z_1 + z_2 + z_3)^3}{3} - 2[(z_1 + z_2)^2 - z_1^2] \cdot z_3 - 2z_1^2 z_2 \right\}. \qquad (19)$$

In one embodiment, the phase conjugators 208 and 210 are symmetrically placed along the optical transmission link 150 and are separated by equal distances (i.e., $z_1 = z_2 = z_3 = z/3$) ("symmetric and equal PC configuration"). As such, the phase variance at the output of the optical transmission link (i.e., $\langle \phi^2 \rangle_3$) is proportional to $z^3/27$. That is, the output phase variance is reduced by a factor of nine. In another embodiment, the phase conjugators 208 and 210 are symmetrically place along the optical transmission link 150, but are separated by unequal distances (e.g., $z_1 = z_3 = z/4$ and $z_2 = z/2$, although other section lengths may be employed) ("symmetric and unequal PC configuration"). In this embodiment, the phase variance at the output of the optical transmission link is proportional to $z^3/48$. That is, the output phase variance is reduced by a factor of 16.

In yet another embodiment, the phase conjugators 208 and 210 may be asymmetrically placed along the optical transmission link 150. The optimal section lengths are $z_1 = z_2 = 2z/5$ and $z_3 = z/5$, although other section lengths may be employed. Such a configuration yields a phase variance at the output of the optical transmission link 150 that is proportional to $z^3/75$. That is, the output phase variance is reduced by a factor of 25. As with the embodiment shown in FIG. 1, the NPSC 122 may be used to further reduce the phase variance. The performance improvements are summarized in Table 2, where SE and SU are abbreviations for symmetric and equal PC configuration and symmetric and unequal PC configuration, respectively.

TABLE 2

|  | 2 SE | 2 SE + NC | 2 SU | 2 SU + NC | 2 A | 2 A + NC |
|---|---|---|---|---|---|---|
| Jitter reduction | 9.00 | 36.0 | 16.0 | 16.0 | 25.0 | 25.8 |
| Range extension | 2.08 | 3.30 | 2.52 | 2.52 | 2.92 | 2.95 |

Figure 5:
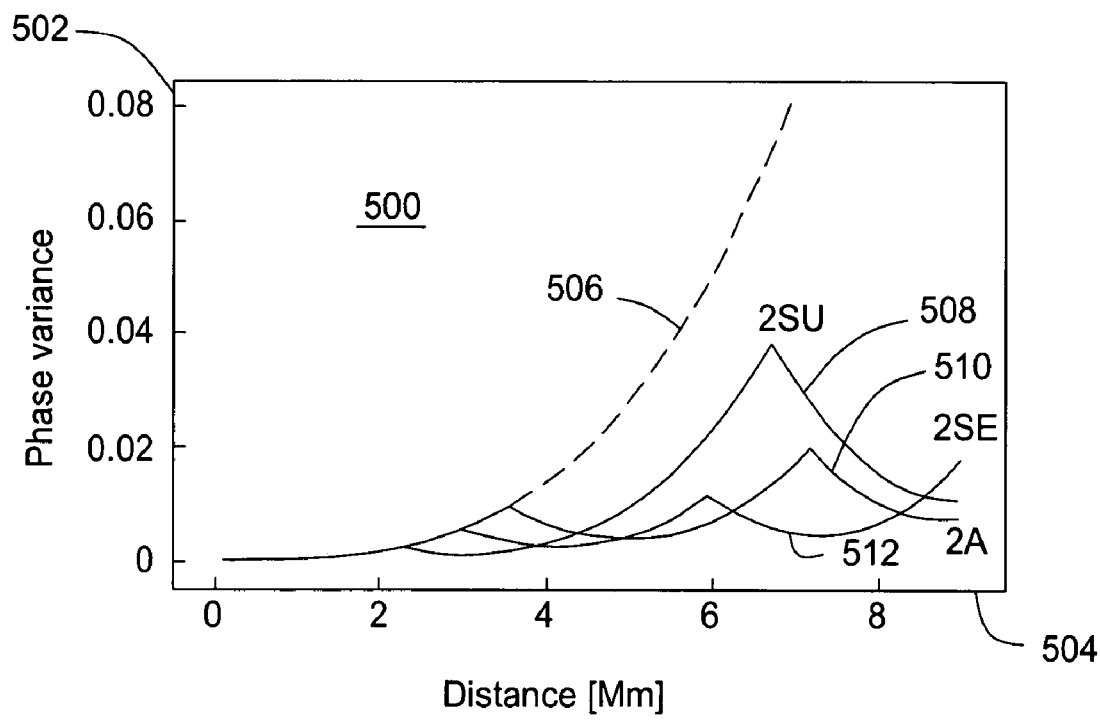
FIG. 5 is a graph depicting an exemplary phase variance versus distance for the optical transmission system of FIG. 2.

FIG. 5 is an exemplary graph 500 illustrating the phase variances as functions of distance for the system of FIG. 2. In this example, the system 100 is configured as follows: The fiber dispersion, loss, and nonlinearity coefficients are −0.3 ps$^2$/km, 0.21 dB/km, and 1.7/km-W, respectively. The total length of the optical transmission link 150 is 9.0 million meters (Mm). Fiber loss is compensated by uniformly-distributed Raman amplification, for which the spontaneous-emission factor is 1.1. The soliton full-width at half-maximum is 30 ps and the associated peak power was 0.60 mW. Solving the NS equation numerically for an ensemble of approximately $10^4$ solitons yields the graph 500.

Notably, an axis 502 represents phase variance, and an axis 504 represents distance in Mm. A curve 506 represents the phase variance without the presence of a phase conjugator. A curve 508 represents the phase variance with two symmetrically placed phase conjugators separated by unequal distances (e.g., $z_1=z_3=z/4$ and $z_2=z/2$). A curve 512 represents the phase variance with two symmetrically placed phase conjugators separated by equal distances (i.e., $z_1=z_2=z_3=z/3$). A curve 510 represents the phase variance with two asymmetrically placed phase conjugators (e.g., $z_1=z_2=2z/5$ and $z_3=z/5$). As shown, the output phase variance of the system 100 of FIG. 2 is reduced by using the phase conjugators 208 and 210 in both asymmetric and symmetric positions along the optical transmission link 150.

Figure 3:
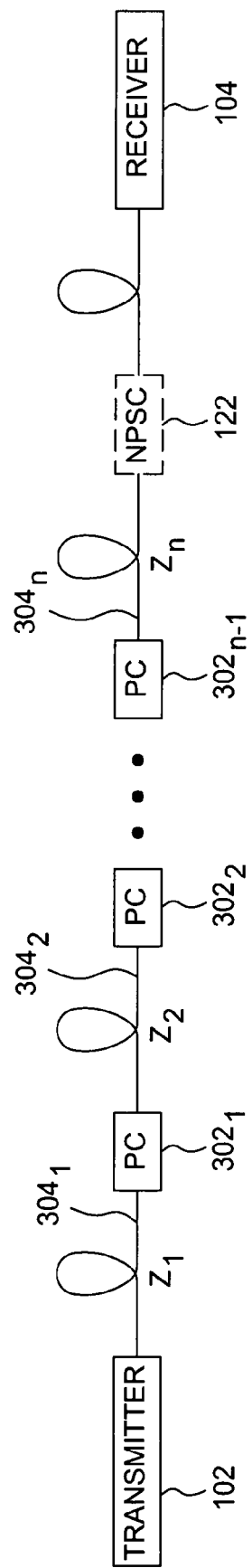
FIG. 3 is a block diagram depicting yet another embodiment of an optical transmission system in accordance with the invention.

FIG. 3 is a block diagram depicting yet another embodiment of the optical transmission system 100 in accordance with the invention. Elements of FIG. 3 that are the same or similar to elements of FIG. 1 are designated with identical reference numerals and are described in detail above. In the present embodiment, the optical transmission link 150 comprises n−1 phase conjugators $302_1$ through $302_{n-1}$ (collectively referred to as phase conjugators 302) that divide the optical transmission link 150 into n sections $304_1$ through $304_n$ (collectively referred to as sections 304). The sections $304_1$ through $304_n$ have lengths of $z_1$ through $z_n$, respectively. As apparent from the embodiments of FIGS. 1 and 2, the performance of the system 100 depends upon the number of phase conjugators used along the optical transmission link. In the present embodiment, the cumulative length of the optical transmission link 150 is defined as $$x_n = \sum_{i=1}^{n} z_n$$

and the squared length is defined as $$y_n^2 = \sum_{i=1}^{n} (-1)^{n-i} x_i^2,$$

where n is the number of sections 304. Since $y^2_{n+1}=x^2_{n+1}-y^2_n$, one can show that:

$$\frac{\langle p^2 \rangle_n}{\sigma_p} = x_n, \tag{20}$$

$$\frac{\langle p\phi \rangle_n}{\sigma_p \bar{\gamma}} = \frac{x_n^2}{2} - y_{n-1}^2, \tag{21}$$

$$\frac{\langle \phi^2 \rangle_n}{\sigma_p \bar{\gamma}^2} = \frac{x_n^3}{3} - 2\sum_{i=1}^{n-1} y_i^2 z_{i+1}. \tag{22}$$

For symmetrically placed phase conjugators 302 of equal separation, the phase variance may be represented as follows:

$$\frac{\langle \phi^2 \rangle_n}{\sigma_p \bar{\gamma}^2 z^3} = \frac{1}{3n^2} - \frac{1}{4n^2}, \tag{23}$$

where the first term on the right side applies to systems without an NPSC, and both terms on the right side apply to systems with an NPSC. For symmetrically placed phase conjugators 302 of unequal separation, the phase variance may be represented as follows:

$$\frac{\langle \phi^2 \rangle_n}{\sigma_p \bar{\gamma}^2 z^3} = \frac{1}{12(n-1)^2} - \frac{[1+(-1)^n]}{32(n-1)^4}. \tag{24}$$

With symmetrically placed phase conjugators 302 of unequal separation, NPSC is only possible for even n (odd n−1), and its effectiveness decreases rapidly as n increases. For asymmetric systems, which are obtained by removing the last half-sections from the corresponding symmetric systems of equal separation, the phase variance may be represented as follows:

$$\frac{\langle \phi^2 \rangle_n}{\sigma_p \bar{\gamma}^2 z^3} = \frac{1}{3(2n-1)^2} - \frac{1}{4(2n-1)^4}. \tag{25}$$

In asymmetric systems, NPSC is always possible, but its effectiveness decreases rapidly as n increases.

For large values of n, symmetrically placed phase conjugators 302 of equal separation and compensated with an NPSC 122, symmetrically placed phase conjugators 302 of unequal separation, and asymmetrically placed phase conjugators 302 all perform comparably well. Let $z_i$ denote the length of a typical section between phase conjugators 302. Then in each case considered, the reduced phase variance associated with the power kicks is of order $\sigma_p(\bar{\gamma}z_i)^2z$, whereas the phase variance associated with the phase kicks is $\sigma_\phi z$.

While the foregoing is directed to the illustrative embodiments of the present invention, other and further embodiments of the invention may be devised without departing from the basic scope thereof, and the scope thereof is determined by the claims that follow.

The invention claimed is:

1. An apparatus for transmitting a light signal in an optical transmission system, comprising:
   a modulator for encoding data by phase modulation;
   an optical transmission link configured to propagate optical pulses comprising the encoded data from an input port to an output port;
   a phase conjugator disposed between the input port and the output port, the phase conjugator being positioned to reduce noise-induced phase variance of the optical pulses at the output port; and
   a nonlinear phase-shift compensator disposed between the phase conjugator and the output port.

2. The apparatus of claim 1, further comprising:
   at least one additional phase conjugator disposed between the phase conjugator and the output port.

3. The apparatus of claim 1, wherein the optical transmission link tends to exhibit a constant dispersion between the input port and the output port.

4. The apparatus of claim 1, wherein the optical transmission link is dispersion managed between the input port and the output port.

5. The apparatus of claim 1, wherein the optical pulses propagate within a single channel of the optical transmission link.

6. The apparatus of claim 1, wherein the optical pulses propagate within multiple channels of the optical transmission link.

7. The apparatus of claim 1, wherein a distance between the input port and the phase conjugator is substantially one half of a total distance between the input port and the output port.

8. The apparatus of claim 1, wherein a distance between the input port and the phase conjugator is substantially two thirds of a total distance between the input port and the output port.

9. The apparatus of claim 1, further comprising:
   another phase conjugator disposed between the phase conjugator and the output port, wherein a first distance between the input port and the phase conjugator, a second distance between the phase conjugator and the other phase conjugator, and a third distance between the other phase conjugator and the output port are substantially equal.

10. The apparatus of claim 1, further comprising:
    another phase conjugator disposed between the phase conjugator and the output port, wherein a first distance between the input port and the phase conjugator and a second distance between the other phase conjugator and the output port are substantially one quarter of a total distance between the input port and the output port, and a third distance between the phase conjugator and the other phase conjugator is substantially one of the total distance.

11. The apparatus of claim 1, further comprising:
    another phase conjugator disposed between the phase conjugator and the output port, wherein a first distance between the input port and the phase conjugator and a second distance between the phase conjugator and the other phase conjugator are substantially two fifths of a total distance between the input port and the output port, and a third distance between the other phase conjugator and the output port is substantially one fifth of the total distance.

12. A method of reducing phase jitter in an optical transmission system, the optical transmission system configured to transmit information using phase relationships between adjacent ones of optical pulses, the method comprising:
    propagating the optical pulses through an optical transmission link having an input port and an output port;
    conjugating phase of the optical pulses at a first point of the optical transmission link between the input port and the output port to reduce noise-induced phase variance of the optical pulses at subsequent points to the first point; and
    performing nonlinear phase-shift compensation of the optical pulses by a value proportional to a power of the optical pulses at a second point of the optical transmission link after the first point.

13. The method of claim 12, further comprising:
    conjugating the phase of the optical pulses at a second point of the optical transmission link between the first point and the output port, wherein a first distance between the input port and the first point and a second distance between the first point and the second point are substantially two fifths of a total distance between the input port and the output port, and a third distance between the second point and the output port is substantially one fifth of the total distance.

14. The method of claim 12, further comprising:
    conjugating the phase of the optical pulses at one or more additional points of the optical transmission link between the first point and the output port.

15. The method of claim 12, wherein a distance between the input port and the first point is substantially one half of a total distance between the input port and the output port.

16. The method of claim 12, wherein a distance between the input port and the first point is substantially two thirds of a total distance between the input port and the output port.

17. The method of claim 12, further comprising:
    conjugating the phase of the optical pulses at a second point of the optical transmission link between the first point and the output port, wherein a first distance between the input port and the first point, a second distance between the first point and the second point, and a third distance between the second point and the output port are substantially equal.

18. The method of claim 12, further comprising:
    conjugating the phase of the optical pulses at a second point of the optical transmission link between the first point and the output port, wherein a first distance between the input port and the first point and a second distance between the second point and the output port are substantially one quarter of a total distance between the input port and the output port, and a third distance between the first point and the second point is substantially one half of the total distance.

19. An optical transmission system, comprising:
    a transmitter for producing optical pulses comprising data encoded by phase modulation;
    an optical transmission link for propagating the optical pulses;
    a receiver for receiving the optical pulses from the optical transmission link;
    a phase conjugator disposed between the transmitter and the receiver, the phase conjugator positioned to reduce noise-induced phase variance of the optical pulses at the receiver; and
    a nonlinear phase-shift compensator disposed between the phase conjugator and the receiver.

20. The system of claim 19, further comprising:

another phase conjugator disposed between the phase conjugator and the receiver, wherein a first distance between the transmitter and the phase conjugator and a second distance between the other phase conjugating and the receiver are substantially one quarter of a total distance between the Transmitter and the receiver, and a third distance between the phase conjugator and the other phase conjugator is substantially one half of the total distance.

21. The system of claim 19, further comprising:

another phase conjugator disposed between the phase conjugator and the receiver, wherein a first distance between the transmitter and the phase conjugator and a second distance between the phase conjugator and the other phase conjugator are substantially two fifths of a total distance between the transmitter and the receiver, and a third distance between the other phase conjugator and the receiver is substantially one fifth of the total distance.

22. The system of claim 19, further comprising:

at least one additional phase conjugator disposed between the phase conjugator and the receiver.

23. The system of claim 19, wherein a distance between the transmitter and the phase conjugator is substantially one half of a total distance between the transmitter and the receiver.

24. The system of claim 19, wherein a distance between the transmitter and the phase conjugator is substantially two thirds of a total distance between the transmitter and the receiver.

25. The system of claim 19, further comprising:

another phase conjugator disposed between the phase conjugator and the receiver, wherein a first distance between the transmitter and the phase conjugator, a second distance between the phase conjugator and the other phase conjugator, and a third distance between the other phase conjugator and the receiver are substantially equal.

* * * * *